(12) United States Patent
Kaluskar et al.

(10) Patent No.: US 7,366,713 B2
(45) Date of Patent: Apr. 29, 2008

(54) EXTENSIBLE RULES ENGINE IN A DATABASE MANAGEMENT SYSTEM

(75) Inventors: Sanjay Kaluskar, Mountain View, CA (US); Wei Wang, Foster City, CA (US); Dieter Gawlick, Palo Alto, CA (US); James Stamos, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 571 days.

(21) Appl. No.: 10/418,882

(22) Filed: Apr. 17, 2003

(65) Prior Publication Data

US 2003/0212657 A1 Nov. 13, 2003

Related U.S. Application Data

(63) Continuation-in-part of application No. 10/254,383, filed on Sep. 24, 2002, now Pat. No. 7,127,467.

(60) Provisional application No. 60/378,018, filed on May 10, 2002.

(51) Int. Cl.
*G06F 17/30* (2006.01)
(52) U.S. Cl. .......................... 707/3; 707/100; 719/310
(58) Field of Classification Search ................. 707/1–5, 707/7, 8, 10, 100–104.1, 200–202, 9; 706/45–47, 706/50; 709/200–203, 223–226; 714/1, 714/100; 717/100, 114, 117, 136, 140, 36; 705/1
See application file for complete search history.

(56) References Cited

U.S. PATENT DOCUMENTS 4,815,030 A 3/1989 Cross et al.

(Continued)

FOREIGN PATENT DOCUMENTS

EP 0743596 A2 11/1996

(Continued)

OTHER PUBLICATIONS

M.F. Wyle, "A Wide Area Network Information Filter," Proceedings International Conference on Artificial Intelligence Applications on Wall Street, Oct. 9, 1991, New York, US, Los Alamitos, CA Oct. 9, 1991, XP000534152, pp. 10-15.

(Continued)

*Primary Examiner*—Debbie M Le
(74) *Attorney, Agent, or Firm*—Hickman Palermo Truong & Becker LLP

(57) ABSTRACT

An extensible rules engine that uses database technology provides a rules evaluation service for applications external to the database server or database management system. Applications are able to utilize the rules engine to provide alternative behaviors based on information against which specified conditions are evaluated. A framework is provided for specifying data definitions that can be referenced by user-defined rules, through creation and use of an evaluation context. Application-specific data types can be defined by specifying data tables and/or variables that can be referenced by rules created for evaluation against data that is associated with the evaluation context. The data against which rules are evaluated can be provided as an in-memory object. A security model is provided in which the privilege to create rules according to a particular evaluation context is controlled by one privilege, whereas the privilege to access underlying tables or variables is controlled by another privilege.

27 Claims, 3 Drawing Sheets

U.S. PATENT DOCUMENTS

| | | | |
|---|---|---|---|
| 5,072,405 | A | 12/1991 | Ramakrishna et al. |
| 5,283,856 | A | 2/1994 | Gross et al. |
| 5,446,885 | A | 8/1995 | Moore et al. |
| 5,627,764 | A | 5/1997 | Schutzman et al. |
| 5,640,561 | A | 6/1997 | Satoh et al. |
| 5,680,602 | A | 10/1997 | Bloem et al. |
| 5,692,125 | A | 11/1997 | Schloss et al. |
| 5,802,253 | A | 9/1998 | Gross et al. |
| 5,852,818 | A | 12/1998 | Guay et al. |
| 5,870,552 | A | 2/1999 | Dozier et al. |
| 5,873,075 | A | 2/1999 | Cochrane et al. |
| 5,873,084 | A | 2/1999 | Bracho et al. |
| 5,940,839 | A | 8/1999 | Chen et al. |
| 5,970,244 | A | 10/1999 | Nagahashi et al. |
| 5,984,786 | A * | 11/1999 | Ehrman ............... 463/42 |
| 5,995,980 | A | 11/1999 | Olson et al. |
| 5,999,931 | A | 12/1999 | Breitbart et al. |
| 6,021,443 | A | 2/2000 | Bracho et al. |
| 6,038,601 | A | 3/2000 | Lambert et al. |
| 6,067,540 | A | 5/2000 | Ozbutun et al. |
| 6,073,129 | A | 6/2000 | Levine et al. |
| 6,122,639 | A | 9/2000 | Babu et al. |
| 6,182,086 | B1 | 1/2001 | Lomet et al. |
| 6,185,555 | B1 | 2/2001 | Sprenger et al. |
| 6,247,017 | B1 | 6/2001 | Martin |
| 6,285,997 | B1 | 9/2001 | Carey et al. |
| 6,304,882 | B1 | 10/2001 | Strellis et al. |
| 6,401,090 | B1 | 6/2002 | Bailis et al. |
| 6,405,191 | B1 | 6/2002 | Bhatt et al. |
| 6,427,146 | B1 | 7/2002 | Chu |
| 6,442,568 | B1 | 8/2002 | Velasco et al. |
| 6,466,950 | B1 | 10/2002 | Ono |
| 6,473,772 | B1 | 10/2002 | Barrett et al. |
| 6,490,574 | B1 | 12/2002 | Bennett et al. |
| 6,502,093 | B1 | 12/2002 | Bhatt et al. |
| 6,539,381 | B1 | 3/2003 | Prasad et al. |
| 6,560,592 | B1 | 5/2003 | Reid et al. |
| 6,604,093 | B1 | 8/2003 | Etzion et al. |
| 6,604,100 | B1 | 8/2003 | Fernandez et al. |
| 6,681,383 | B1 | 1/2004 | Pastor et al. |
| 6,691,155 | B2 | 2/2004 | Gottfried |
| 6,697,791 | B2 | 2/2004 | Hellerstein et al. |
| 6,728,879 | B1 | 4/2004 | Atkinson |
| 6,738,975 | B1 * | 5/2004 | Yee et al. ............... 719/310 |
| 6,757,710 | B2 * | 6/2004 | Reed ............... 709/203 |
| 6,826,579 | B1 | 11/2004 | Leymann et al. |
| 6,850,893 | B2 * | 2/2005 | Lipkin et al. ............... 707/1 |
| 6,868,413 | B1 | 3/2005 | Grindrod et al. |
| 6,901,410 | B2 | 5/2005 | Marron et al. |
| 6,917,946 | B2 * | 7/2005 | Corl et al. ............... 707/102 |
| 6,925,476 | B1 | 8/2005 | Multer et al. |
| 7,003,531 | B2 | 2/2006 | Holenstein et al. |
| 7,080,382 | B2 | 7/2006 | Sexton et al. |
| 7,089,228 | B2 | 8/2006 | Arnold et al. |
| 7,149,738 | B2 * | 12/2006 | Kumar et al. ............... 707/9 |
| 2001/0047270 | A1 | 11/2001 | Gusick et al. |
| 2002/0062475 | A1 | 5/2002 | Iborra et al. |
| 2002/0073019 | A1 | 6/2002 | Deaton |
| 2002/0091685 | A1 | 7/2002 | Feldman et al. |
| 2002/0116457 | A1 | 8/2002 | Eshleman et al. |
| 2002/0120734 | A1 | 8/2002 | Riosa et al. |
| 2002/0133507 | A1 | 9/2002 | Holenstein et al. |
| 2002/0138582 | A1 | 9/2002 | Chandra et al. |
| 2002/0152149 | A1 | 10/2002 | Tanaka et al. |
| 2003/0046421 | A1 * | 3/2003 | Horvitz et al. ............... 709/238 |
| 2003/0061061 | A1 | 3/2003 | Cox et al. |
| 2003/0120642 | A1 | 6/2003 | Egilsson et al. |
| 2003/0135523 | A1 | 7/2003 | Brodersen et al. |
| 2003/0212670 | A1 | 11/2003 | Yalamanchi et al. |
| 2003/0236834 | A1 | 12/2003 | Gottfried |
| 2004/0133591 | A1 | 7/2004 | Holenstein et al. |
| 2004/0181543 | A1 | 9/2004 | Wu et al. |
| 2004/0193575 | A1 | 9/2004 | Chen et al. |
| 2005/0010545 | A1 | 1/2005 | Joseph |
| 2005/0021567 | A1 | 1/2005 | Holenstein et al. |
| 2005/0125371 | A1 | 6/2005 | Bhide et al. |
| 2005/0193024 | A1 | 9/2005 | Beyer et al. |
| 2005/0203940 | A1 | 9/2005 | Farrar et al. |
| 2005/0222978 | A1 | 10/2005 | Drory et al. |

FOREIGN PATENT DOCUMENTS

| | | |
|---|---|---|
| EP | 0 959 416 A2 | 11/1999 |
| GB | 2 274 182 A | 7/1994 |
| GB | 2 354 847 A | 4/2001 |
| GB | 2 354 848 A | 4/2001 |
| JP | 05089143 | 4/1993 |
| JP | 06319024 | 11/1994 |
| WO | WO 98/33131 A1 | 7/1998 |
| WO | WO 01/08048 A | 2/2001 |
| WO | WO 01/08048 A1 | 2/2001 |
| WO | WO 01/88795 A1 | 11/2001 |
| WO | WO 03098479 A | 5/2003 |

OTHER PUBLICATIONS

Jim Binkley, et al: "Rama: An Architecture for Internet Information Filtering," Journal of Intelligent Information Systems, vol. 5, No. 2, Sep. 1, 1995, XP000617268, pp. 81-99.

Patrick A. O'Donnell, et al., "Deadlock-Free and Collision-Free Coordination of Two Robot Manipulators," 1989, IEEE, XP 000041489, pp. 484-489.

Clara Nippl, et al., "Accelerating Profiling Services by Parallel Database Technology," undated, 9 pages.

Norman W. Paton, et al., "Active Database Systems," Mar. 1999, ACM Computing Surveys, vol. 31, No. 1., pp. 63-103.

Charles L. Forgy, "Rete: A Fast Algorithm for the Many Pattern/Many Object Pattern Match Problem," *Artificial Intelligence*, 1982, pp. 17-37.

Marcos K. Aguilera, et al., "Matching Events in a Content-based Subscription System," 1999, Symposium on Principles of Distributed Computing, 9 pages.

Umeshwar Dayal, et al., "Active Database Systems," *Modern Database Systems: The Object Model, Interoperability, and Beyond*, Addison-Wesley, Reading, Massachusetts, Sep. 1994, 25 pages.

Jagannathan Srinivasan, et al., "Extensible Indexing: A Framework For Integrating Domain-Specific Indexing Schemes Into Oracle8*i*," Oracle Corporation, 16th International Conference on Data Engineering, Feb. 28-Mar. 3, 2000, San Diego, California, 10 pages.

Patrick O'Neil, et al., "Improved Query Performance with Variant Indexes," SIGMOD '97 May 1997, Tucson, Arizona, USA, pp. 1-12.

Eric N. Hanson, et al., "Optimized Rule Condition Testing in Ariel using Gator Networks," Oct. 23, 1995, University of Florida, TR-95-027, pp. 1-24.

International Searching Authority, "Notification of Transmittal of the International Search Report or the Declaration," Feb. 12, 2004, 9 pages.

IBM Corp., "Improved Rete Algorithm—Hashing Techniques Applied to Partial Match Memories," IBM Technical Disclosure Bulletin, vol. 35, No. 3, Aug. 1992, p. 149.

U.S. Appl. No. 10/254,383, filed Sep. 24, 2002, Yalamanchi et al.
U.S. Appl. No. 10/365,771, filed Feb. 12, 2003, Yalamanchi.
U.S. Appl. No. 10/815,220, filed Mar. 30, 2004, Yalamanchi.

Current Claims in PCT application, International Application No. PCT/US03/23747, 14 pages.

International Searching Authority, "Notification of Transmittal of the International Search Report or the Delcaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

Segev, A. et al., "Rule Activation Techniques in Active Database Systems", Journal of Intelligent Information Systems, 7(2):173-194, Oct. 1996, 23 pages.

PCT Written Opinion from corresponding PCT/US03/14892.

U.S. Appl. No. 10/254,383, filed Sep. 24, 2002, Yalamanchi et al.

Greco, Gianluigi et al., Event choice datalog: a logic programming language for reasoning in multiple dimensions, 2004, ACM Press, pp. 238-249.

U.S. Appl. No. 10/365,771, filed Feb. 12, 2003.

BEA, :Using Expressions and Conditions, WebLogic Process Integrator Release 1.1, 2000, located on the internet at <http://e-docs.bea.com/wlpi/wlpiII/studio/ch6.htm>, retrieved on Dec. 29, 2005, 12 pages.

Chamberlain, Don, "Query Languages and XML," Powerpoint Presentation, IBM Almaden Research Center, Dec. 2000, located on the internet at <http://www-db.sc.wisc.edu/dbseminar/fall00/talks/chamberlain>, 26 pages.

Chamberlain, Don et al., "XQuery: A Query Language for XML," W3C Working Draft, Feb. 15, 2001, located on the internet at <http://www.w3.org/TR/2001/WD-xquery-20010215/>, retrieved on Dec. 29, 2005, 83 pages.

Clark, James et al., "XML PATH Language (XPath), Version 1.0," W3C, 1999, located on the internet at <http://www.w3.org/TR/xpath.html>, retrieved on Dec. 29, 2005, 37 pages.

Krishnaprasad, Muralidhar et al., "Query Rewrite in Oracle XML DB," Proceeding of the 30th VLDB Conference, 2004, pp. 1134-1145.

Unknown Author, unknown title, located on the internet at <www.cs.uku.fi/kilpelai/RDK01/lectures/Xquery.pdf>, 2001, 10 pages.

International Searching Authority, "Notification of Transmittal of the International Search Report and the Written Opinion of the International Searching Authority, or the Declaration," PCT/US2005/009598, dated Nov. 29, 2005, 18 pages.

Current Claims, PCT/US2005/009598, 6 pages.

Grosof, Benjamin N. et al., "SweetDeal: Representing Agent Contracts with Exceptions using XML Rules. Ontologies, and Process Descriptions," XP002354519, pp. 340-348.

Paton, Norman W. et al., "Active Database Systems," ACM Computing Surveys, vol. 31, No. 1, Mar. 1999, XP002354519, pp. 63-103.

International Preliminary Examining Authority, "Notification of Transmittal of the International Preliminary Examination Report," PCT/US2005/009598, dated Jul. 10, 2006, 6 pages.

Amended Claims, PCT/US2005/009598, 6 pages (attached).

U.S. Appl. No. 10/452,761, filed May 30, 2003.

Bailey, James et al., "An Event-Condition-Action Language for XML," WWW 2002; Honolulu, Hawaii; May 7-11, 2002; ACM 1-58113-449, pp. 486-495.

Paton, Norman W. et al., "Active Database Systems," ACM Computing Surveys, vol. 31, No. 1, Mar. 1999, 47 pages.

U.S. Appl. No. 10/815,220, filed Mar. 30, 2004.

U.S. Appl. No. 10/434,451, filed May 8, 2003.

U.S. Appl. No. 11/034,490, filed Jan. 12, 2005.

U.S. Appl. No. 10/449,873, filed May 30, 2003.

U.S. Appl. No. 10/452,850, filed May 30, 2003.

\* cited by examiner

EXTENSIBLE RULES ENGINE IN A DATABASE MANAGEMENT SYSTEM

CROSS REFERENCE TO RELATED APPLICATIONS

This application is a continuation-in-part application and claims the benefit of domestic priority under 35 U.S.C. § 120 from U.S. patent application Ser. No. 10/254,383 entitled "Managing Expressions In A Database System," filed on Sep. 24, 2002 now U.S. Pat. No. 7,127,467; and claims the benefit of domestic priority under 35 U.S.C. § 119(e) from U.S. Provisional Patent Application No. 60/378,018 entitled "Managing Expressions In A Database System," filed on May 10, 2002; and is related to U.S. patent application Ser. No. 10/365,771 entitled "Managing XPath Expressions In A Database System," filed on Feb. 12, 2003, U.S. Pat. No. 6,405,191 entitled "Content Based Publish-And-Subscribe System Integrated in a Relational Database System," issued on Jun. 11, 2002, and U.S. Pat. No. 6,502,093, entitled "Approach for Publishing Data in a Relational Database System," issued on Dec. 31, 2002; all of which are incorporated by reference in their entirety for all purposes as if fully set forth herein.

FIELD OF THE INVENTION

The present invention relates generally to database management systems and, more specifically, to techniques for formulating and evaluating rules in database management systems.

BACKGROUND OF THE INVENTION

Evaluation of rules against a container of information or data is a common process in many computer applications. For example, content-based publish/subscribe systems have become widely used and in such systems, subscribers specify the content that they are interested in by creating rules with conditions. A primary goal of such a system is to determine what subscriptions match with a given data element or message, based on evaluation of the rules against input data or messages. A core element of the technology that enables an efficient operation for matching a large number of conditions with corresponding data is a rules evaluation engine, or simply, a rules engine.

In general, database technology can be leveraged to provide an efficient rules engine for evaluating a massive number of rules against massive amounts of data. Technological advances have been made in this area of database technology; however, the solution is usually intrinsically tied to the specific problem being solved.

Many computer applications or application features can benefit from having flexibility with respect to their behavior relative to externally specified conditions. Such conditions are often used to customize an application or to deploy an application efficiently. The conditions can change over time and, therefore, may need to be evaluated frequently.

Based on the foregoing, it is clearly desirable to provide a rules engine based on a database management system, which accommodates service to applications external to a database server.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
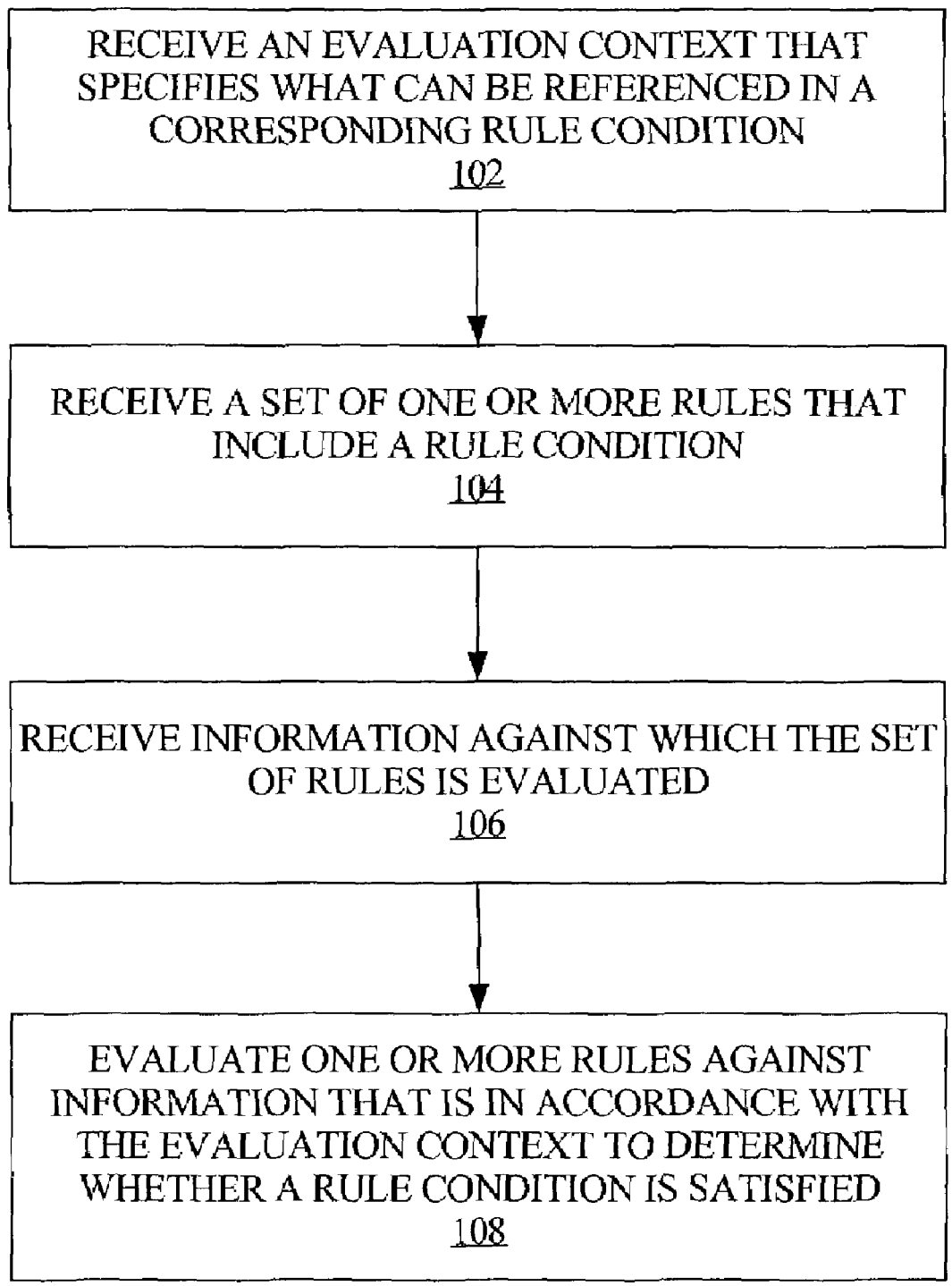
FIG. 1 is a flow diagram that illustrates a process for evaluating rules in a database management system.

A method and system are described for evaluating rules with an extensible rules engine in a database management system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

An extensible rules engine that uses database technology provides a rules evaluation service for applications and application features external to the database server or database management system. For example, the rules engine is independent of an internal database publish-subscribe system. Context that is typically implicit in a rules engine embedded in some other feature is, in the rules engine described herein, externalized through use of an evaluation context. Thus, applications or application features are able to utilize the rules engine to provide alternative behaviors based on states of information against which specified conditions are evaluated.

An extensible framework is provided to database systems for specifying data definitions that can be referenced by user-defined rules, through creation and use of evaluation contexts. A rule evaluation context defines data that can be referenced in rule conditions. Therefore, domain-specific or application-specific data types can be defined by specifying data tables and/or variables. Such tables and variable can be referenced by rules created for evaluation against data that is in accordance with the evaluation context. The rules can include any expression that is allowed in a SQL WHERE clause. The data, messages, or information (herein referred to simply as "data") against which rules are evaluated can reside in persistent memory or can be provided as an in-memory object. That is, the data may be received at the rules engine "in-process" from an application.

A security model is provided in which the privilege to create rules according to a particular evaluation context is controlled by one privilege, whereas the privilege to access underlying tables or variables is controlled by another privilege. Thus, security administration is simplified because a single security privilege is not grantable in multiple ways (i.e., based on the evaluation context and on the underlying data). Furthermore, creation of evaluation contexts is simplified because a given evaluation context can point to interesting objects without providing access to those objects.

A rule evaluation scheme is provided in which partial evaluation, of simple conditions only, is allowed. When a "fast mode" evaluation is performed against input data without all of the tables and/or variables in the evaluation context, some rules that are in fact TRUE or FALSE are conservatively returned as MAYBE (unknown) if the cost of evaluating them more accurately is high, such as when executing SQL is necessary.

The foregoing features, utilized separately or collectively, allow applications to capitalize on the power of database technology supporting a rules engine. Hence, more flexible applications can be developed using an extensible rules engine as described further herein.

Evaluating Rules in a Database System

FIG. 1 is a flow diagram that illustrates a technique for evaluating rules in a database management system. The description of the technique introduces concepts of which more detailed descriptions are provided in sections that follow. For example, in the context of database management systems, the technique illustrated in FIG. 1 is performed by a database server.

At block 102, a rule evaluation context (at times referred to herein as an "evaluation context") is received. For example, in the context of a database management system, the evaluation context is received by a database server application, from an external application or thread of execution. The evaluation context specifies what can be referenced in a corresponding rule condition, which is to be evaluated against information that is in accordance with the evaluation context. For example, in an embodiment, an evaluation context specifies table aliases associated with data tables and specifies data variables. Rules that are constructed for evaluation in a given evaluation context should reference one or more of the tables and variables specified in the evaluation context.

In an embodiment, the evaluation context is received from a computer software application that is different than the database server application. Thus, the technique of FIG. 1 facilitates the extension of a rules engine to service applications and processes external to the database server of which the rules engine is part.

At block 104, a set of one or more rules is received. Each rule includes a condition. Rules constructed to correspond with a given evaluation context are evaluated against data that includes, for example, one or more of the tables and variables specified in the evaluation context.

In an embodiment, the evaluation context received at block 102 is associated with the set of rules received at block 104. In such an embodiment, each rule in the set of rules is evaluated according to the evaluation context, if the rule does not have a different evaluation context associated with it. Alternatively, an evaluation context is associated with one or more rules in the set of rules, instead of with the entire set of rules. Hence, different rules received from an application process can have different associated evaluation contexts, or all of the rules received from the application process can have the same associated evaluation context.

In an embodiment, the steps depicted at blocks 102 and 104 are the same step. That is, both the rule evaluation context and an associated set of rules are received substantially concurrently, for example, from an application process.

In one embodiment, at optional block 106, information against which the set of rules is evaluated is received. For example, an application process provides the data to the rules engine, in addition to providing (1) the evaluation context associated with the data and (2) the rule set to be applied to the corresponding data. The data, evaluation context and rule set may be received separately or together. Alternatively to block 106, data against which the rule set is evaluated may be accessed by the rules engine from persistent storage rather than received from a client application process.

At block 108, one or more rules of the set of rules received at block 104 is evaluated against information that is in accordance with an associated evaluation context, such as the information received at block 106. For example, in the embodiment in which data tables or table aliases and variables are specified in an evaluation context, information or data that is stored in such tables or that includes values for such variables are in accordance with the given evaluation context.

To summarize, (1) an evaluation context specifies what can be referenced in an associated rule condition, with respect to data, data containers, data variables, and the like; (2) a rule, which is evaluated against data that corresponds to a given evaluation context, includes a condition that references at least some of what is specified in the associated evaluation context; and (3) the rule is evaluated against data or information that corresponds to the given evaluation context, such as information or data that is stored in tables or that includes values for variables that are specified in the given evaluation context.

Rule Condition

A rule condition combines one or more expressions and operators and returns a Boolean value of TRUE, FALSE, or NULL. An expression represents a value, which can be, for example, data in a table, data in variables, or data returned by a SQL function or PL/SQL function. For example, the condition department_id=30 consists of two expressions ("department_id" and "30") and an operator ("="). Here, the value is data in the department_id column of a table. The logical condition evaluates to TRUE for a given row when the department_id column is 30.

A single rule condition may include more than one condition combined with the AND, OR, or NOT conditional operators to form compound conditions. An example of a compound condition is as follows.

department_id=30 OR job_title='Programmer'.

Generally, if either condition evaluates to TRUE, then the rule evaluates to TRUE.

Rule conditions may contain variables. In an implementation, a variable is denoted, in a rule condition, with a preceding colon. An example of a variable used in a rule condition is as follows.

:x=55;

which specifies a condition that is returned TRUE when the variable x equals 55. Variables enable reference to data that is not stored in a table. Use of variables may also improve performance by replacing a commonly occurring expression. Hence, instead of evaluating the same expression multiple times, the variable is evaluated once.

In an embodiment, a rule condition may also include a result of an evaluation of another subprogram. Such a condition is evaluated as are other conditions, i.e., it evaluates to TRUE, FALSE, or NULL. In an embodiment, user-defined types for variables are allowed. Therefore, variables can have attributes. When a variable has attributes, each attribute contains partial data for the variable. In an implementation, attributes are specified using dot notation, for example, :y.z=9, which evaluates to TRUE if the value of attribute z in variable y equals 9.

A simple rule condition is a condition that has either of the following forms:

[simple_rule_expression] [operator] [constant], or

[constant] [operator] [simple_rule_expression].

In one embodiment, in a simple rule condition, a simple_rule_expression is one of the following: (1) table column; (2) variable; (3) variable attribute; and (4) method result, where the method takes no arguments and the method result can be returned by the variable method function so that the expression is a numerical or character type.

The significance of simple rule conditions is that (1) simple rule conditions are internally indexed by the rules engine; (2) simple rule conditions can be evaluated without executing SQL; and (3) simple rules can be evaluated with partial data, described further below.

In an implementation, for table columns, variables, and variable attributes, numeric (NUMBER, FLOAT, DOUBLE, INTEGER) and character (CHAR, VARCHAR2) types are supported. Use of other types of expressions results in non-simple rule conditions. Furthermore, use of operators other than "<=", "<", "=", ">", and ">=" results in non-simple rule conditions. A constant is a fixed value, such as a number, a character, or a character string.

Rules with simple rule conditions are referred to as simple rules. A combination of two or more simple rule conditions with the conditional operators AND or OR remains a simple rule. However, using the NOT conditional operator in a rule condition causes the rule to be non-simple.

In an implementation, a client can specify that only simple rules should be evaluated by specifying "true" for a simple_rules_only parameter of a DBMS_RULE.EVALUATE command.

Rule Evaluation Context

A rule evaluation context defines data that can be referenced in rule conditions. The referenced data can be external to the database server of which the rules engine is part and can be external to the database management system of which the database server is part. An evaluation context can be implemented as a database object. The data defined in an evaluation context can take the form of variables, table data, or both. For example, if a rule condition were a WHERE clause in a SQL query, then the external data in a rule's associated evaluation context would be the tables and bind variables in a FROM clause of the query. That is, expressions in a rule condition are to reference the tables, table aliases, and variables defined in an associated evaluation context to produce a valid WHERE clause.

A rule evaluation context provides the necessary information for interpreting and evaluating the rule conditions that reference external data. For example, if a rule refers to a variable, then the information in the associated evaluation context includes the variable type. For another example, if a rule refers to a table alias, then the information in the associated evaluation context includes a definition of the table alias. In other words, the data objects referenced by a given rule are identified in and determined by the associated rule evaluation context, and the rule conditions included in the given rule are resolved using the schema defined or specified in the evaluation context associated with the given rule.

Furthermore, a rule owner needs the privileges necessary to access the objects referenced in a rule, such as a SELECT privilege on tables and an EXECUTE privilege on types. In an embodiment, management of an evaluation context (e.g., creation and modification) is controlled with a first security privilege and access to the tables and/or variables that are defined in the evaluation context are controlled by a second security privilege that is different than the first security privilege. Thus, use of an evaluation context in the creation and application of rules does not allow access to the underlying data objects against which the rules are evaluated. Access to the data objects is controlled independent of the evaluation context.

An example of the contents of an evaluation context EC, without syntax, is as follows.

table alias tab1 for the table user1.table with the following columns {x of type NUMBER, y of type NUMBER};

variable x is of type NUMBER;

variable y is of type user1.type, where user1.type is an abstract data type (ADT) with the following attributes {α of type NUMBER, b of type CHAR(10)};

variable MAX is of type NUMBER, and is implicit; its value is retrieved through function user1.return_MAX.

A table alias is shorthand for an underlying table expression such as a table name or a sub-query. Variables are referenced by their names and their types are specified in their definitions. Variables can be designated as implicit, in which case their values do not need to be explicitly supplied during evaluation but can be accessed through a callback interface associated with the rules engine.

The value of a variable referenced in a rule condition may be explicitly specified when the rule is evaluated, or the value of a variable may be implicitly available given the associated input event or data against which the rule condition is evaluated. Explicit variables are supplied by the caller at evaluation time. Implicit variables are not given a value supplied by the caller at evaluation time. The value of an implicit variable is obtained by calling a variable value function, which is defined during the creation of an evaluation context. In an implementation, if a value for an implicit variable is specified during evaluation, then the specified value overrides the value returned by the variable value function.

Rules become meaningful once they are associated with an evaluation context. A single rule evaluation context can be associated with one or more rules or with rule sets. The following describes which evaluation context is used when a rule is evaluated, in accordance with an embodiment.

(1) If an evaluation context is directly associated with a rule, then such evaluation context is used for the rule whenever the rule is evaluated. Furthermore, any evaluation context associated with the rule set of which the rule is part is not used.

(2) If a rule does not have an associated evaluation context, but an evaluation context is specified for the rule when it is added to a rule set, then the evaluation context specified in an ADD_RULE (or similar) procedure is used for the rule when the rule set is evaluated.

(3) If no evaluation context is associated with a rule and none was specified by an ADD_RULE or similar procedure, then the evaluation context of the rule set is used for the rule when the rule set is evaluated.

Given the evaluation context EC described above, and the following rule conditions, C1: ((:x<4) AND (:y.a=10)) OR (length(:y.b)<:MAX), C2: (:y.a=5) OR (tabl.y<10), C3: (:x=5), these rule conditions can be applied as WHERE clauses as follows:

SELECT ... FROM user1.table tab1

WHERE ((:x<4) AND (:y.a=10)) OR (length(:y.b)<:MAX), (:y.a=5) OR (tab1.y<10), (:x=5).

Whereas the SELECT statement evaluates its condition for all rows of user1. table, rules evaluation only evaluates the condition for one row at a time or part of a row at a time.

Rule Action Context

In an embodiment, an optional rule action context contains information associated with a rule that is interpreted by the client of the rules engine, such as an external application, when the rule is evaluated for an event. In an implementation, an action context is of a type that contains an array of name-value pairs. Rule action context information provides a context for the action taken by a client when a rule evaluates to TRUE or MAYBE. The rules engine does not interpret the action context. Rather, the rules engine returns the action context to the client, where the associated information is interpreted.

For example, suppose an event is defined as the addition of a new employee to a company. If the employee information is stored in a table, then the event occurs whenever a row is inserted into the table. The company, as the client, specifies a number of actions that are taken when a new employee is added, where the actions depend on which department the employee joins. One such action is registering the new employee for a course relating to the department. In this scenario, the company can create a rule for each department, with an appropriate action context. Thus, an action context that is returned from the rules engine to the client when an associated rule evaluates to TRUE specifies the number of a course in which the associated employee should be registered. The client application to which the rules engine returns the action context registers the new employee in the course with the returned course number.

Rule Set Evaluation

The extensible rules engine described herein evaluates rule sets against one or more events. An event is an occurrence that is defined by the client of the rules engine, which invokes the rules engine by calling a procedure. Such a procedure enables the client to send some information about the event to the rules engine for evaluation against a rule set.

In an embodiment, the information specified by the client when it calls the rules engine procedure includes the following.

(1) The name of the rule set that contains the rules to evaluate against the event.

(2) The evaluation context to use for evaluation. In an implementation, only the rules that use the specified evaluation context are evaluated.

(3) Data, such as table values and/or variable values. The table values include rowids that refer to the data in table rows and the variable values include the data for explicit variables. If a specified variable has attributes, then the client can send a value for the entire variable, or the client can send values for any number of the variable's attributes.

(4) An optional event context, which in an implementation is a varray that contains name-value pairs that include information about the event. This optional information is not directly used or interpreted by the rules engine. Rather, the information is passed to client callbacks, such as an evaluation function, a variable value function (for implicit variables), or a variable method function.

The client may also send other information as to how to evaluate an event against the rule set using the procedure call. For example, the client may specify if evaluation is to stop as soon as the first TRUE rule or the first MAYBE rule is found. For another example, the client may specify whether evaluation results should be returned as a complete list or returned iteratively.

Figure 2:
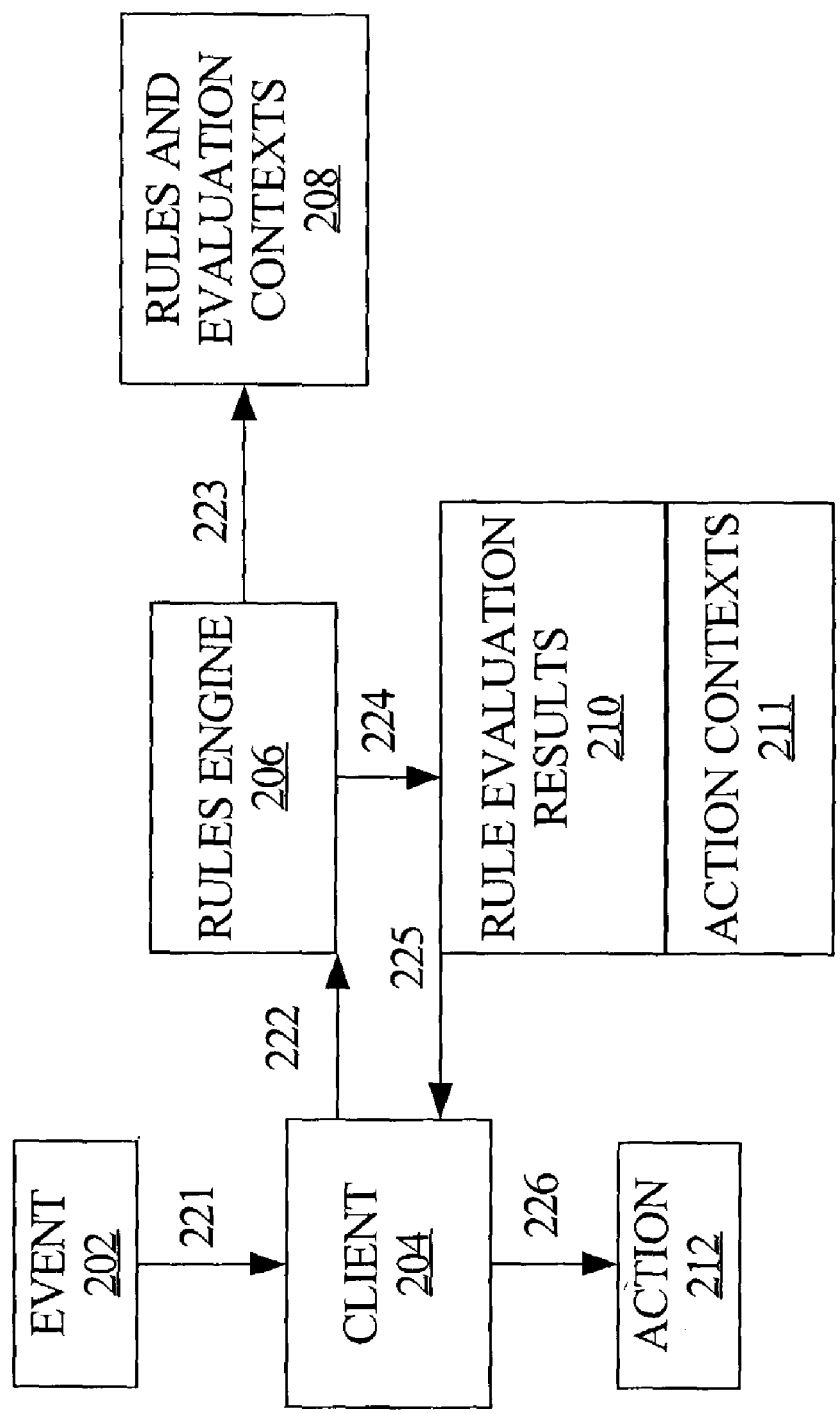
FIG. 2 is a block diagram that assists in illustrating a process for rule evaluation involving a client application and a rules engine.

FIG. 2 is a block diagram that assists in illustrating a technique for rule evaluation involving a client application and a rules engine. FIG. 2 further illustrates the interaction between an event 202; a client 204 of rules engine 206; rules and evaluation contexts 208, as described above; rule determinations 210, such as TRUE, FALSE, and NULL; action contexts 211; and action 212.

At step 221, an evaluation process typically is triggered by the occurrence of a client-defined event, the nature of which is unlimited. Client 204 initiates evaluation of a rule set by sending information about event 202 to rules engine 206 using a procedure call command, at step 222.

At step 223, rules engine 206 evaluates the rule set for the event using the relevant evaluation context by accessing and applying rules and evaluation contexts 208. In this scenario, rules and evaluation contexts 208 were previously created by client 204 and stored for access by rules engine 206. Client 204 specifies both the applicable rule set and the evaluation context in the call to the procedure. In an embodiment, only the rules that are in the specified rule set and that use the specified evaluation context are used in the evaluation.

At step 224, the rules engine 206 determines rules evaluation results 210 with respect to evaluation of the rules from the rule set against data that characterizes or represents the event 202. Data specified for evaluation may comprise, relative to the applicable evaluation context, (1) rows from one or more tables, such as a row from table alias tab1;(2) column values for rows from tables, such as the value of column tab1. y; (3) values of variables, such as the value of variable x; and (4) attribute values for variables, such as the value of attribute z.a.b. Such data may be provided by client 204 to rules engine 206 using the call to the procedure, or may be accessed by rules engine 206 from persistent storage, such as from storage disk. Rules conditions, and hence rules, eventually evaluate to TRUE, FALSE, or NULL (i.e., unknown).

At step 225, rules engine 206 returns rules that evaluate to TRUE to client 204, either in a complete list or iteratively. Each returned rule is returned with its action context 211, if applicable. In an embodiment, the rules that evaluate to MAYBE during an initial evaluation phase are also returned to client 204. At step 226, client 204 performs one or more actions 212 based on the results returned by the rules engine 206 at step 225, and according to action context 211 if applicable.

In general, the data supplied for evaluation allows some of the eligible rules to be evaluated, while some rules may reference columns, variables or attributes that are unavailable in the supplied data. Partial evaluation occurs when the invoked procedure is executed without data for all the tables and variables in the specified evaluation context. With partial evaluation, some rules that are in fact TRUE or FALSE may be conservatively returned as a MAYBE, such as when a rule condition references unavailable data and is not a simple condition that can be evaluated without executing a query such as a SQL query. Thus, with partial evaluation, only simple conditions within a rule are evaluated.

If a rule condition has disjunctive elements D1, D2 and D3 such that the rule, R, evaluates to TRUE upon D1 OR D2 OR D3 being met, and element D1 has conjunctive elements C1 AND C2, and there is sufficient information to evaluate C1 but not C2, then partial evaluation may be utilized. With partial evaluation, D1 is evaluated to FALSE if C1 is simple and evaluates to FALSE and D1 is evaluated to MAYBE if C1 is simple and evaluates to TRUE. A similar scenario applies if C2 information is available and C1 information is not, whereby D1 evaluates to MAYBE if C2 is simple and evaluates to TRUE. The rule R evaluates to (1) TRUE if at least one disjunctive element (D1, D2, D3) evaluates to TRUE; (2) MAYBE if no disjunctive element evaluates to TRUE and at least one disjunctive element evaluates to MAYBE; and (3) FALSE, otherwise.

Hardware Overview

Figure 3:
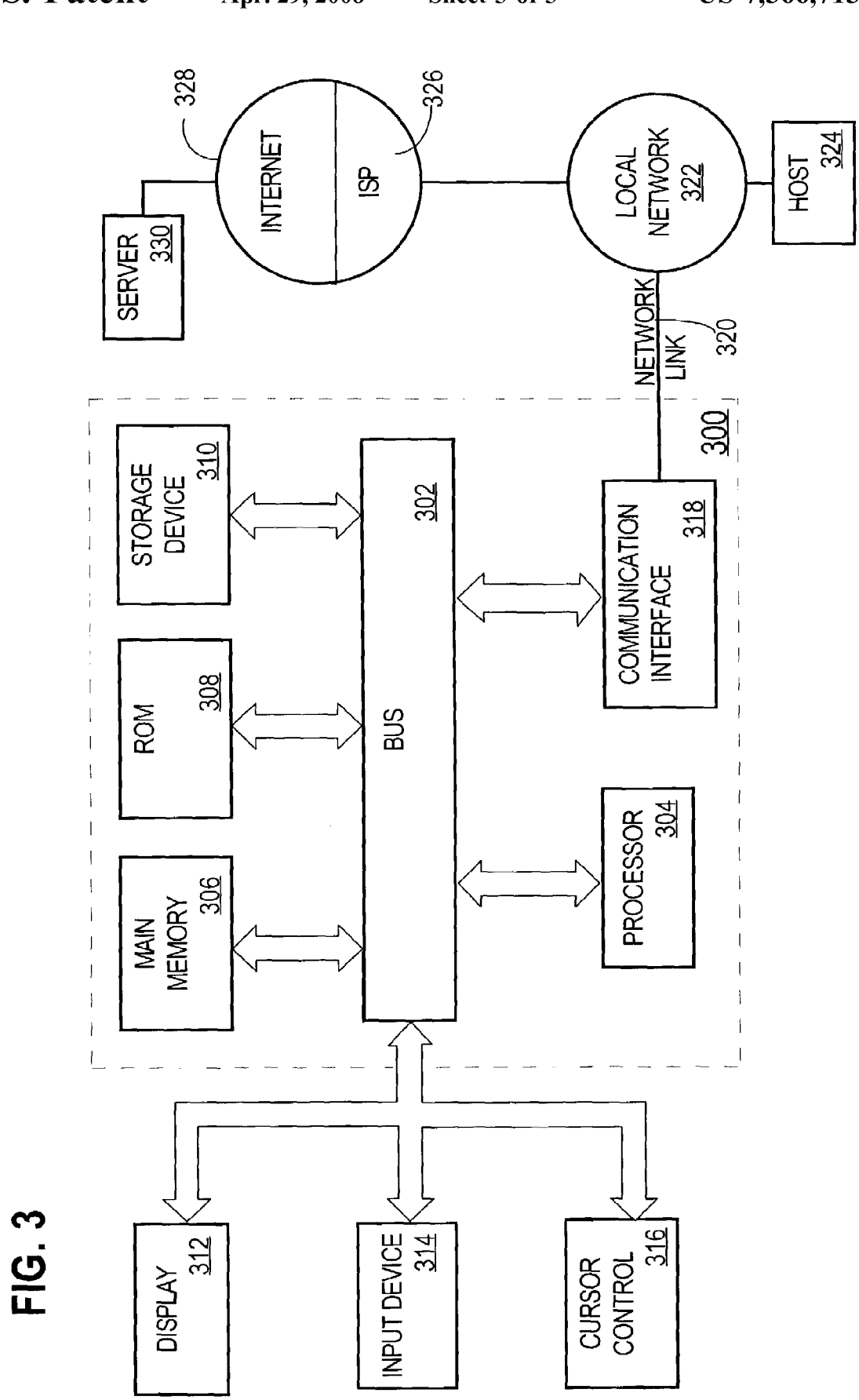
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for evaluating rules in a database system, the method comprising the steps of:
    receiving, at the database system and from a particular application, an evaluation context;
    wherein the evaluation context specifies a definition of a data object associated with the particular application;
    receiving, at the database system and from the particular application, a set of one or more rules;
    wherein each rule in the set of one or more rules includes at least one rule condition;
    wherein a particular rule in the set of one of more rules includes a particular rule condition that references said data object;
    within the database system, (a) selecting the evaluation context, from a plurality of available evaluation contexts, as the evaluation context to use to evaluate the particular rule, (b) using the evaluation context to determine the definition of the data object, and (c) evaluating the particular rule against the data object based on the definition of the data object, to determine whether the particular rule condition is satisfied; and
    sending, from the database system to the particular application, an indication of whether the particular rule condition is satisfied.

2. The method of claim 1, wherein the step of receiving an evaluation context includes receiving an evaluation context that specifies a list of one or more data tables that are referenced in said particular rule condition.

3. The method of claim 1, wherein the step of receiving an evaluation context includes receiving an evaluation context that defines one or more variables that are referenced in said particular rule condition.

4. The method of claim 1, wherein the step of receiving an evaluation context includes receiving an evaluation context that specifies a list of one or more data tables that are referenced in a rule condition of at least one rule from said set, and defines one or more variables that are referenced in a rule condition of at least one rule from said set.

5. The method of claim 1,
    wherein the step of receiving an evaluation context includes receiving an evaluation context that specifies a list of one or more data tables that are referenced in said particular rule condition; and the method further comprises the steps of:
    controlling management of the evaluation context with a first security privilege; and
    controlling access to the one or more tables with a second security privilege that is different than the first security privilege.

6. The method of claim 1,
    wherein the steps of receiving include receiving from a software application;
    wherein the step of evaluating is performed by a database server; and
    wherein the software application is different than the database server.

7. The method of claim 6, further comprising the step of:
    receiving data from the software application; and
    without persistently storing the data in the database system, evaluating the set of rules against the data received from the software application is evaluated.

8. The method of claim 1,
    wherein the step of receiving a set of rules includes receiving a rule that includes a first rule condition and a second rule condition that is disjunctively related to the first rule condition and wherein the first rule condition includes a third rule condition and a fourth rule condition that is conjunctively related to the third rule condition;
    wherein the data that the one or more rules are evaluated against includes third data that is associated with the third condition and does not include fourth data that is associated with the fourth condition; and
    wherein the step of evaluating includes
        evaluating the third condition against the third data to determine whether the third condition is satisfied by the third data;
        if the third condition is not satisfied by the third data, then returning an indication that the first condition is not satisfied; and
        if the third condition is satisfied by the third data, then returning an indication that the first condition may be satisfied.

9. The method of claim 8, wherein the third condition is a simple rule condition.

10. The method of claim 8, wherein:
if at least one indication is returned that the first condition is satisfied or that the second condition is satisfied, then returning an indication that the rule is satisfied;
if no indication is returned that the first condition is satisfied or that the second condition is satisfied and if at least one indication is returned that the first condition may be satisfied or that the second condition may be satisfied, then returning an indication that the rule may be satisfied; and
if no indication is returned that the first condition is satisfied or that the second condition is satisfied and no indication is returned that the first condition may be satisfied or that the second condition may be satisfied, then returning an indication that the rule is not satisfied.

11. The method of claim 1, wherein:
the step of receiving an evaluation context includes receiving an evaluation context that is associated with a subset of the set of
the evaluation context is selected, from the plurality of available evaluation contexts, based on the particular rule belonging to said subset.

12. The method of claim 1, wherein:
the step of receiving an evaluation context includes receiving an evaluation context that is associated with each rule of the set of rules; and
the evaluation context is selected, from the plurality of available evaluation contexts, based on the association between the evaluation context and the set of rules.

13. The method of claim 1, wherein the step of receiving an evaluation context and the step of receiving the set of rules are performed by a single act of receiving a message that includes both the evaluation context and the set of rules.

14. A computer-readable storage medium carrying one or more sequences of instructions which, when executed by one or more processors, causes the one or more processors to perform the method recited in claim 1.

15. A computer-readable storage medium carrying one or more sequences of instructions which, when executed by one or more processors, causes the one or more processors to perform the method recited in claim 2.

16. A computer-readable storage medium carrying one or more sequences of instructions which, when executed by one or more processors, causes the one or more processors to perform the method recited in claim 3.

17. A computer-readable storage medium carrying one or more sequences of instructions which, when executed by one or more processors, causes the one or more processors to perform the method recited in claim 4.

18. A computer-readable storage medium carrying one or more sequences of instructions which, when executed by one or more processors, causes the one or more processors to perform the method recited in claim 5.

19. A computer-readable storage medium carrying one or more sequences of instructions which, when executed by one or more processors, causes the one or more processors to perform the method recited in claim 6.

20. A computer-readable storage medium carrying one or more sequences of instructions which, when executed by one or more processors, causes the one or more processors to perform the method recited in claim 7.

21. A computer-readable storage medium carrying one or more sequences of instructions which, when executed by one or more processors, causes the one or more processors to perform the method recited in claim 8.

22. A computer-readable storage medium carrying one or more sequences of instructions which, when executed by one or more processors, causes the one or more processors to perform the method recited in claim 9.

23. A computer-readable storage medium carrying one or more sequences of instructions which, when executed by one or more processors, causes the one or more processors to perform the method recited in claim 10.

24. A computer-readable storage medium carrying one or more sequences of instructions which, when executed by one or more processors, causes the one or more processors to perform the method recited in claim 11.

25. A computer-readable storage medium carrying one or more sequences of instructions which, when executed by one or more processors, causes the one or more processors to perform the method recited in claim 12.

26. A computer-readable storage medium carrying one or more sequences of instructions which, when executed by one or more processors, causes the one or more processors to perform the method recited in claim 13.

27. An apparatus for evaluating rules in a database system, the apparatus comprising:
one or more processors;
memory, operatively coupled to the one or more processors;
means for receiving, at the database system and from a particular application, an evaluation context;
wherein the evaluation context specifies a definition of a data object associated with the particular application;
means for receiving, at the database system and from the particular application, a set of one or more rules;
wherein each rule in the set of one or more rules includes at least one rule condition;
wherein a particular rule in the set of one of more rules includes a particular rule condition that references said data object;
means, within the database system, for (a) selecting the evaluation context, from a plurality of available evaluation contexts, as the evaluation context to use to evaluate the particular rule, (b) using the evaluation context to determine the definition of the data object, and (c) evaluating the particular rule against the data object based on the definition of the data object, to determine whether the particular rule condition is satisfied; and
means for sending, from the database system to the particular application, an indication of whether the particular rule condition is satisfied.

* * * * *